(12) United States Patent
Paulsen

(10) Patent No.: US 9,821,829 B1
(45) Date of Patent: Nov. 21, 2017

(54) BOTTOM DUMPING WHEELBARROW

(71) Applicant: Joann Paulsen, Renton, WA (US)

(72) Inventor: Joann Paulsen, Renton, WA (US)

(*) Notice: Subject to any disclaimer, the term of this patent is extended or adjusted under 35 U.S.C. 154(b) by 0 days.

(21) Appl. No.: 15/434,615

(22) Filed: Feb. 16, 2017

(51) Int. Cl.
*B62B 1/18* (2006.01)
*B60P 1/56* (2006.01)
*B62B 3/04* (2006.01)
*B62B 3/00* (2006.01)

(52) U.S. Cl.
CPC ............... *B62B 3/04* (2013.01); *B62B 3/008* (2013.01)

(58) Field of Classification Search
CPC ... B60P 1/56; B62B 1/18; B62B 3/008; B62B 3/04
USPC ............... 298/2, 24, 25, 26, 27, 29, 31
See application file for complete search history.

(56) References Cited

U.S. PATENT DOCUMENTS

| 181,219 | A | * | 8/1876 | Snyder | B61D 7/16 105/253 |
|---|---|---|---|---|---|
| 1,070,308 | A | | 8/1913 | Tyler | |
| 1,638,715 | A | * | 8/1927 | Stubbs | B28C 7/0468 222/293 |
| 1,731,040 | A | * | 10/1929 | Blackmore | B62K 9/00 298/35 R |
| 1,749,805 | A | * | 3/1930 | Elliott | E01C 23/07 298/24 |
| 2,313,591 | A | | 3/1943 | Slaughter | |
| 2,531,503 | A | * | 11/1950 | Talbert | A24F 19/06 220/264 |
| 2,533,549 | A | * | 12/1950 | Bell | B62B 1/24 180/19.3 |
| 2,544,505 | A | * | 3/1951 | Kronhaus | B62B 1/24 280/47.31 |
| 2,751,712 | A | * | 6/1956 | Klint | A63H 17/12 298/1 R |
| 3,029,984 | A | * | 4/1962 | Cooper | B62B 1/22 111/76 |
| 4,365,841 | A | * | 12/1982 | McLaughlin | B60P 1/56 105/282.1 |
| 4,451,053 | A | * | 5/1984 | Alioa | B62B 1/18 280/47.26 |
| 5,190,351 | A | * | 3/1993 | Klumpjan | B62B 1/24 280/47.31 |
| 5,328,402 | A | * | 7/1994 | Hallford | A63H 17/05 446/427 |
| D354,381 | S | | 1/1995 | Hirth, Jr. | |
| 7,537,426 | B1 | * | 5/2009 | Dunn | B62B 3/02 414/414 |

* cited by examiner

*Primary Examiner* — H Gutman
(74) *Attorney, Agent, or Firm* — Stevenson IP, LLC

(57) ABSTRACT

A bottom dumping wheelbarrow including a wheelbarrow having a support frame, an upper member disposed atop the support frame, a pair of handles attached to the support frame, and a plurality of wheels attached to and downwardly extended from the support frame. A door is disposed within a bottom side of the upper member. A control handle is pivotally attached to a bottom surface of the support frame of the wheelbarrow and affixed to the door. The door has an open position and an alternate closed position.

2 Claims, 5 Drawing Sheets

BOTTOM DUMPING WHEELBARROW

BACKGROUND OF THE INVENTION

Various types of wheelbarrows are known in the prior art. However, what has been needed is a bottom dumping wheelbarrow including a wheelbarrow having a support frame, an upper member disposed atop the support frame, a pair of handles attached to the support frame, and a plurality of wheels attached to and downwardly extended from the support frame. What has been further needed is a door disposed within a bottom side of the upper member and a control handle pivotally attached to a bottom surface of the support frame of the wheelbarrow and affixed to the door. Lastly, what has been needed is for the door to have an open position and an alternate closed position. The bottom dumping wheelbarrow thus prevents a user from straining his muscles by having to lift and shake the wheelbarrow from side to side while dumping its contents. Instead, the user can easily open the door to allow the contents of the wheelbarrow to fall to the ground.

FIELD OF THE INVENTION

The present invention relates to wheelbarrows, and more particularly, to a bottom dumping wheelbarrow.

SUMMARY OF THE INVENTION

The general purpose of the present bottom dumping wheelbarrow, described subsequently in greater detail, is to provide a bottom dumping wheelbarrow which has many novel features that result in a bottom dumping wheelbarrow which is not anticipated, rendered obvious, suggested, or even implied by prior art, either alone or in combination thereof.

To accomplish this, the present bottom dumping wheelbarrow includes a wheelbarrow having a support frame, a hopper-shaped upper member disposed atop the support frame, a pair of handles attached to and rearwardly extended from the support frame, and a plurality of wheels attached to and downwardly extended from the support frame. The plurality of wheels is optionally four for improved stability and traction. The hopper-shaped upper member has a front side, a rear side, a right side, a left side, an open top side, and a bottom side. A door is medially disposed within the bottom side of the support frame.

The bottom dumping wheelbarrow further includes a single continuous control handle having a lower linear portion and an upper handle member medially extended outward from the rear side of the hopper-shaped upper member of the wheelbarrow. The lower linear portion is medially and pivotally attached to a bottom surface of the support frame of the wheelbarrow and affixed to the door. The door has an open position and an alternate closed position. The door is in the open position when the single continuous control handle is rotated to a position substantially parallel to the bottom side of the hopper-shaped upper member of the wheelbarrow, and the door is in the closed position when the single continuous control handle is medially disposed adjacent to the rear side of the hopper-shaped upper member of the wheelbarrow. A material disposed within the hopper-shaped upper member of the wheelbarrow is releasable through the door when the door is in the open position. Thus, the bottom dumping wheelbarrow can also act as a spreader for materials including, but not limited to, gravel and sand, disposed within the hopper-shaped upper member of the wheelbarrow.

Thus has been broadly outlined the more important features of the present bottom dumping wheelbarrow so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
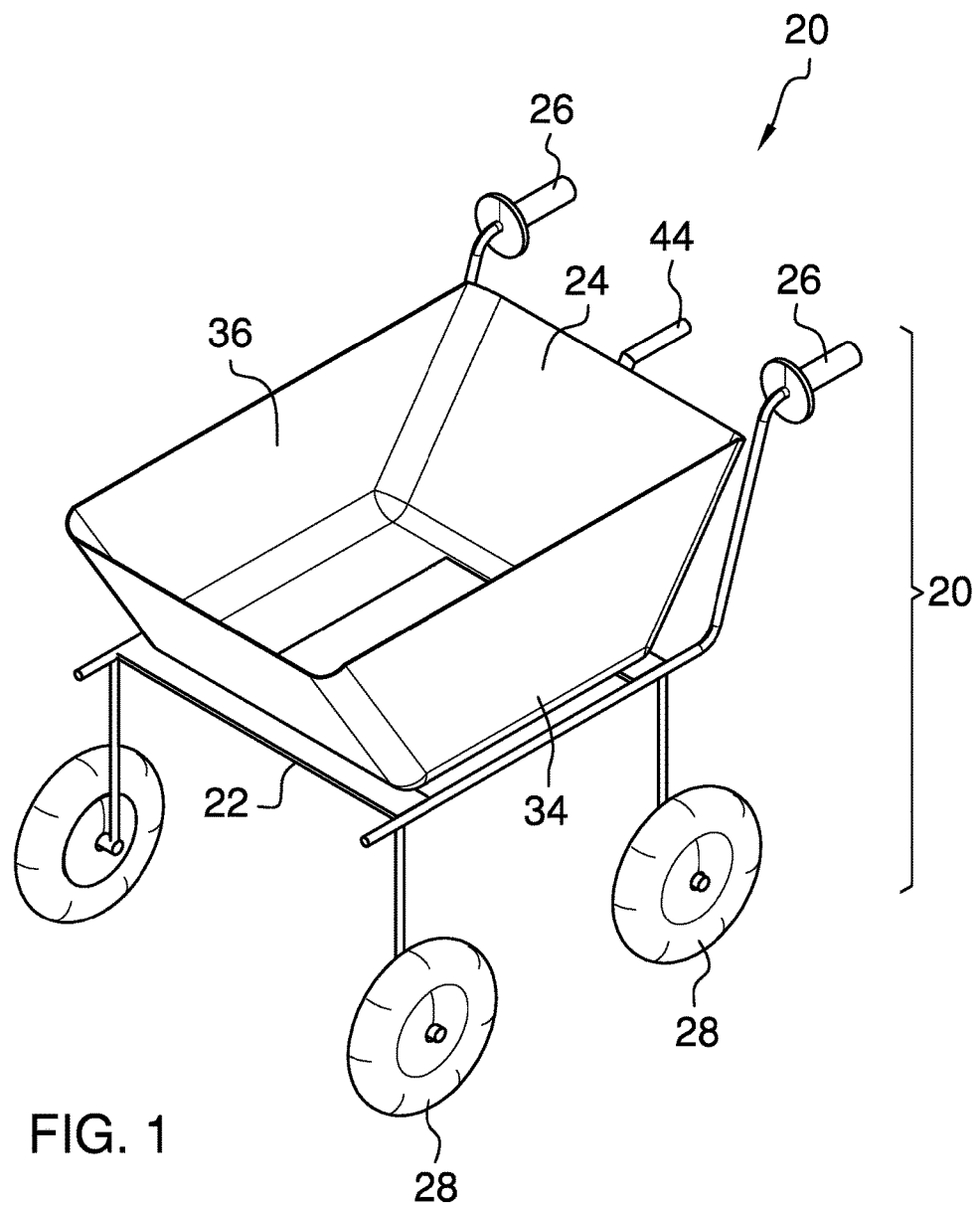
FIG. 1 is a front isometric view.
Figure 2:
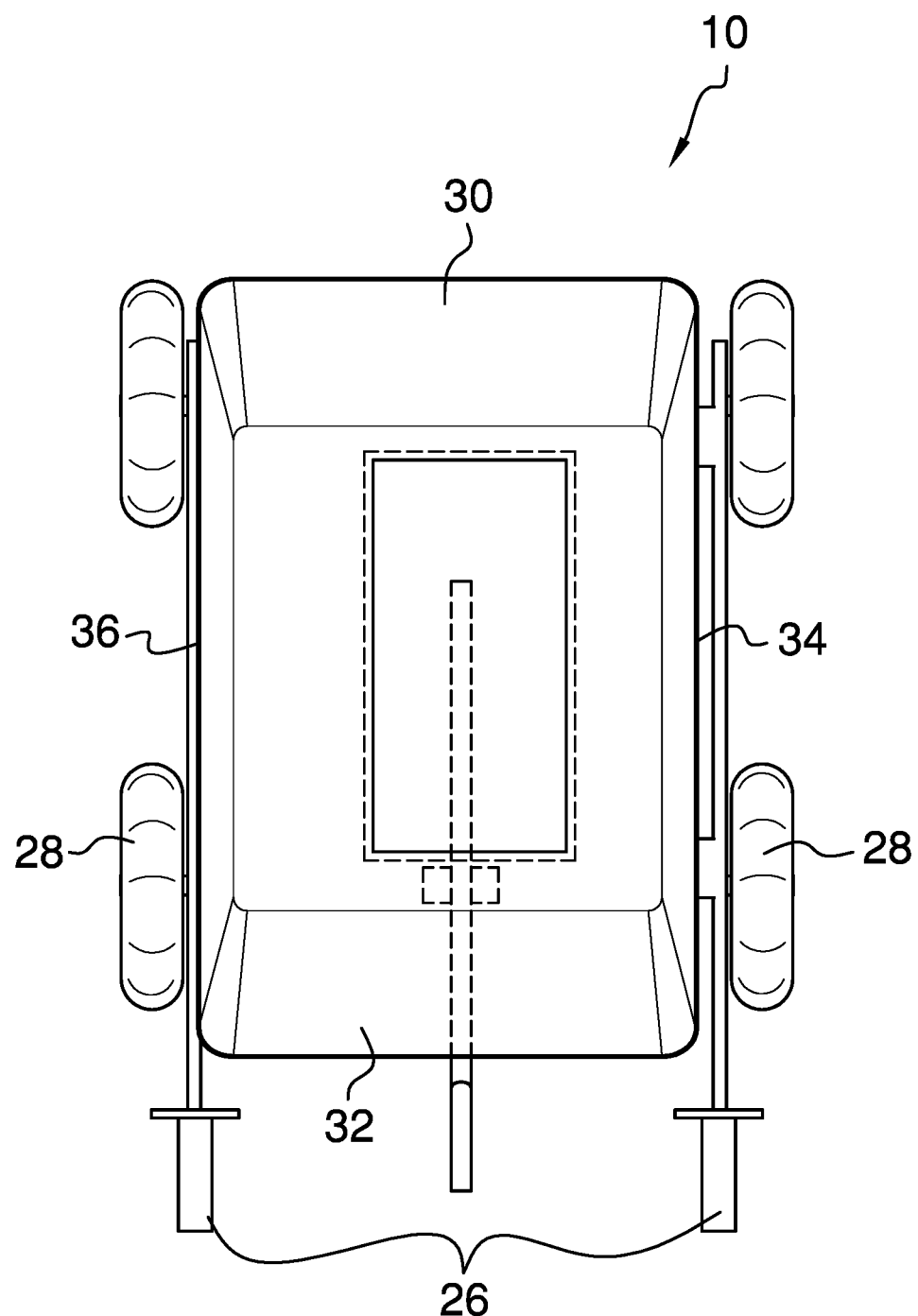
FIG. 2 is a top plan view.
Figure 3:
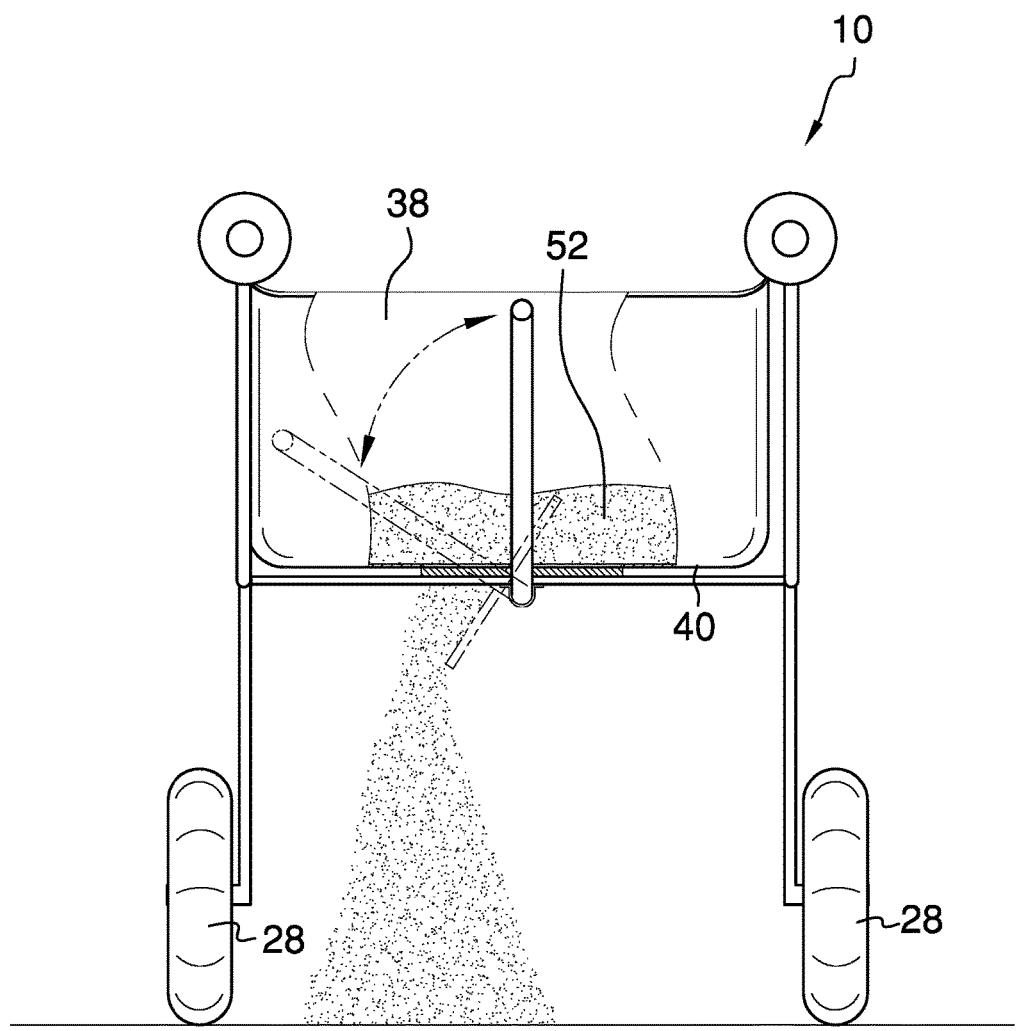
FIG. 3 is a rear elevation view.
Figure 4:
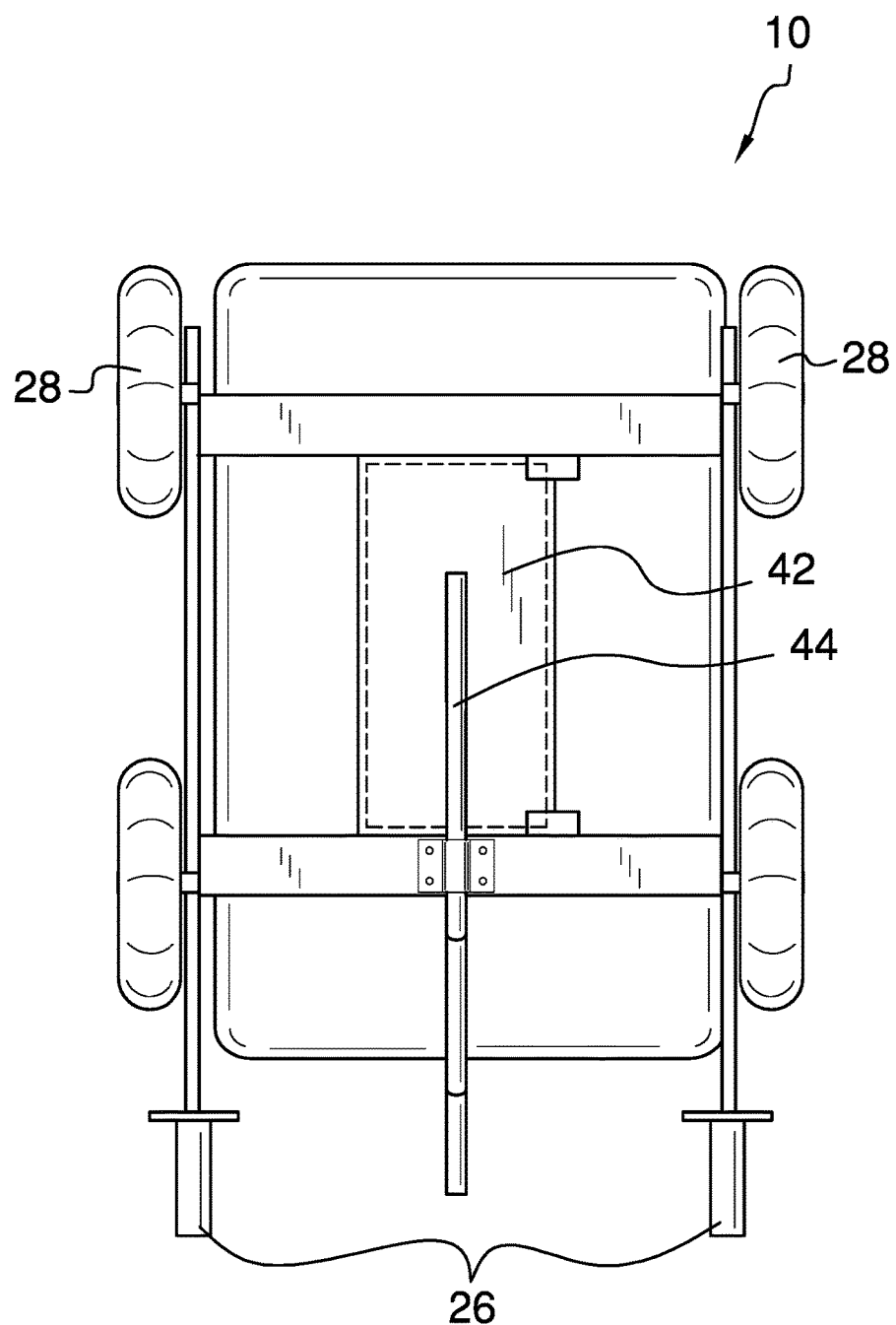
FIG. 4 is a bottom plan view.
Figure 5:
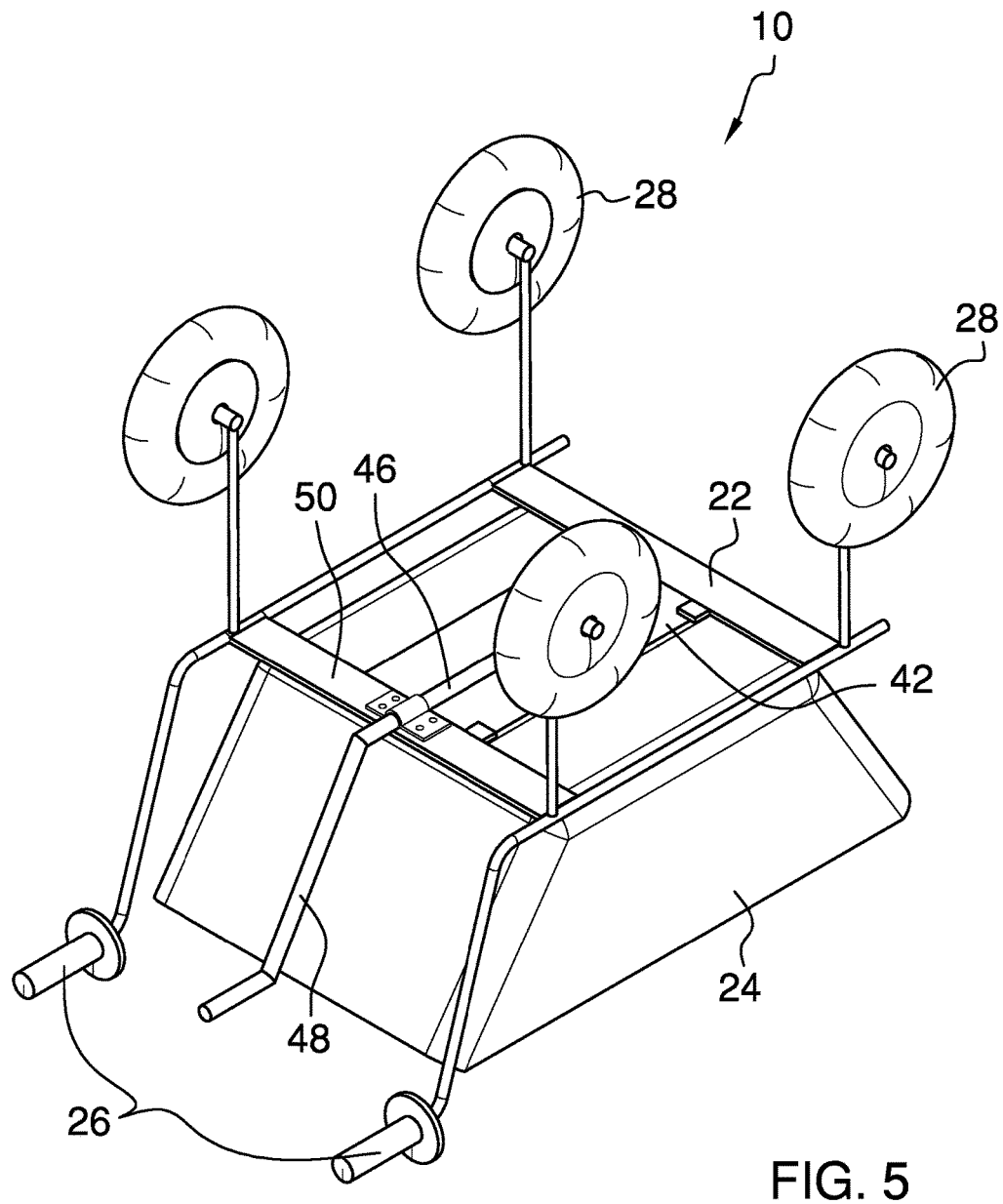
FIG. 5 is a bottom isometric view.

With reference now to the drawings, and in particular FIGS. 1 through 5 thereof, an example of the instant bottom dumping wheelbarrow employing the principles and concepts of the present bottom dumping wheelbarrow and generally designated by the reference number 10 will be described.

Referring to FIGS. 1 through 5 the present bottom dumping wheelbarrow 10 is illustrated. The bottom dumping wheelbarrow 10 includes a wheelbarrow 20 having a support frame 22, a hopper-shaped upper member 24 disposed atop the support frame 22, a pair of handles 26 attached to and rearwardly extended from the support frame 22, and a plurality of wheels 28 attached to and downwardly extended from the support frame 22. The plurality of wheels 28 is optionally four. The hopper-shaped upper member 24 has a front side 30, a rear side 32, a right side 34, a left side 36, an open top side 38, and a bottom side 40. A door 42 is medially disposed within the bottom side 40 of the support frame 22.

The bottom dumping wheelbarrow 10 further includes a single continuous control handle 44 having a lower linear portion 46 and an upper handle member 48 medially extended outward from the rear side 32 of the hopper-shaped upper member 24 of the wheelbarrow 20. The lower linear portion 46 is medially and pivotally attached to a bottom surface 50 of the support frame 22 of the wheelbarrow 20 and affixed to the door 42. The door 42 has an open position and an alternate closed position. The door 42 is in the open position when the single continuous control handle 44 is rotated to a position substantially parallel to the bottom side 40 of the hopper-shaped upper member 24 of the wheelbarrow 20, and the door 42 is in the closed position when the single continuous control handle 44 is medially disposed adjacent to the rear side 32 of the hopper-shaped upper member 24 of the wheelbarrow 20. A material 52 disposed within the hopper-shaped upper member 24 of the wheelbarrow 20 is releasable through the door 42 when the door 42 is in the open position.

What is claimed is:
1. A bottom dumping wheelbarrow comprising:
a wheelbarrow having a support frame, a hopper-shaped upper member disposed atop the support frame, a pair of handles attached to and rearwardly extended from the support frame, and a plurality of wheels attached to and downwardly extended from the support frame, wherein the hopper-shaped upper member has a front side, a rear side, a right side, a left side, an open top side, and a bottom side;

a door medially disposed within the bottom side of the support frame; and a single continuous control handle having a lower linear portion and an upper handle member medially extended outward from the rear side of the hopper-shaped upper member of the wheelbarrow, wherein the lower linear portion is medially and pivotally attached to a bottom surface of the support frame of the wheelbarrow and affixed to the door;

wherein the door has an open position and an alternate closed position;

wherein the door is in the open position when the single continuous control handle is rotated to a position substantially parallel to the bottom side of the hopper-shaped upper member of the wheelbarrow;

wherein the door is in the alternate closed position when the single continuous control handle is medially disposed adjacent to the rear side of the hopper-shaped upper member of the wheelbarrow;

wherein a material disposed within the hopper-shaped upper member of the wheelbarrow is releasable through the door when the door is in the open position.

2. The bottom dumping wheelbarrow of claim 1 wherein the plurality of wheels of the wheelbarrow is four.

\* \* \* \* \*